United States Patent
Yang

(10) Patent No.: US 12,056,897 B2
(45) Date of Patent: Aug. 6, 2024

(54) TARGET DETECTION METHOD, COMPUTER DEVICE AND NON-TRANSITORY READABLE STORAGE MEDIUM

(71) Applicant: BOE TECHNOLOGY GROUP CO., LTD., Beijing (CN)

(72) Inventor: Jinglin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 346 days.

(21) Appl. No.: 17/765,366

(22) PCT Filed: Apr. 9, 2021

(86) PCT No.: PCT/CN2021/086077
§ 371 (c)(1),
(2) Date: Mar. 30, 2022

(87) PCT Pub. No.: WO2021/227723
PCT Pub. Date: Nov. 18, 2021

(65) Prior Publication Data
US 2022/0351413 A1    Nov. 3, 2022

(30) Foreign Application Priority Data
May 15, 2020 (CN) .......................... 202010414578.7

(51) Int. Cl.
*G06T 7/77*    (2017.01)
*G06N 3/045*    (2023.01)
(Continued)

(52) U.S. Cl.
CPC .................. *G06T 7/77* (2017.01); *G06T 7/75* (2017.01); *G06T 2207/10004* (2013.01); *G06T 2207/20076* (2013.01); *G06T 2207/20081* (2013.01)

(58) Field of Classification Search
CPC ... G06T 7/77; G06T 7/75; G06T 2207/10004; G06T 2207/20076; G06T 2207/20081;
(Continued)

(56) References Cited

U.S. PATENT DOCUMENTS

| | | | |
|---|---|---|---|
| 7,352,880 B2 * | 4/2008 | Kim | G06V 40/161 382/103 |
| 2017/0091943 A1 * | 3/2017 | Pan | G06V 10/48 |
| 2021/0034901 A1 * | 2/2021 | Chen | G06T 7/90 |

FOREIGN PATENT DOCUMENTS

| CN | 108764325 A | 11/2018 |
|---|---|---|
| CN | 109344789 A | 2/2019 |

(Continued)

*Primary Examiner* — Asghar H Bilgrami
(74) *Attorney, Agent, or Firm* — IP & T GROUP LLP

(57) ABSTRACT

A target detection method includes: determining detection points corresponding to regions in an image to be detected and a probability value of a target in a region corresponding to each detection point according to the image to be detected; screening out a first detection point having a maximum probability value, and second detection point(s) having probability value(s) less than the probability value of the first detection point and greater than or equal to a probability threshold; if a first distance between each second detection point and the first detection point is greater than or equal to a distance threshold, updating an original probability value of the second detection point to obtain an updated probability value; comparing the updated probability value with the probability threshold to obtain a comparison result; and determining whether a new target in a region corresponding to the second detection point according to the comparison result.

17 Claims, 7 Drawing Sheets

(51) Int. Cl.
   *G06N 3/08* (2023.01)
   *G06T 7/73* (2017.01)
   *G06V 10/25* (2022.01)
   *G06V 10/44* (2022.01)

(58) Field of Classification Search
   CPC ... G06T 2207/20084; G06T 7/73; G06N 3/08; G06N 3/045; G06V 10/25; G06V 10/44; G06V 2201/07
   See application file for complete search history.

(56) References Cited

FOREIGN PATENT DOCUMENTS

| | | | | |
|---|---|---|---|---|
| CN | 109671103 A | * | 4/2019 | |
| CN | 109815868 A | | 5/2019 | |
| CN | 111242977 A | * | 6/2020 | ......... G06K 9/00718 |
| CN | 111598088 A | | 8/2020 | |
| WO | WO-2019123582 A1 | * | 6/2019 | ............... G06T 7/00 |

* cited by examiner

TARGET DETECTION METHOD, COMPUTER DEVICE AND NON-TRANSITORY READABLE STORAGE MEDIUM

CROSS-REFERENCE TO RELATED APPLICATIONS

This application is a national phase entry under 35 USC 371 of International Patent Application No. PCT/CN2021/086077, filed on Apr. 9, 2021, which claims priority to Chinese Patent Application No. 202010414578.7, filed on May 15, 2020, which are incorporated herein by reference in their entirety.

TECHNICAL FIELD

Embodiments of the present disclosure relate to a target detection method, a computer device, and a non-transitory computer-readable storage medium.

BACKGROUND

In the field of computer vision, target detection is a basic research direction having practical significance of application. Through the target detection, it is possible to recognize targets (e.g., human beings, animals, plants, and vehicles) existing in images, and mark the recognized targets.

SUMMARY

In an aspect, a target detection method is provided. The target detection method includes: determining, according to an image to be detected, a plurality of detection points corresponding to a plurality of regions in the image to be detected, and a probability value of a target existing in a region corresponding to each detection point; screening out, from all the detection points, a first detection point having a maximum probability value and at least one second detection point having probability value(s) less than the probability value of the first detection point and greater than or equal to a probability threshold, the target existing in a region corresponding to the first detection point; determining whether a first distance between each second detection point and the first detection point is greater than or equal to a distance threshold, and if it is determined that the first distance is greater than or equal to the distance threshold, updating an original probability value of the second detection point to obtain an updated probability value; comparing the updated probability value with the probability threshold to obtain a comparison result, and determining, according to the comparison result, whether a new target exists in a region corresponding to the second detection point.

In some embodiments, updating the original probability value of the second detection point to obtain the updated probability value includes: determining, according to the first distance, a probability reduction of the second detection point, the probability reduction being positively correlated with the first distance; and obtaining a difference value between the original probability value of the second detection point and the probability reduction as the updated probability value of the second detection point.

In some embodiments, updating the original probability value of the second detection point to obtain the updated probability value includes: inputting the probability value of the second detection point, as a dependent variable, into a preset function to obtain a first parameter; the preset function being a monotonically decreasing function and located in a first quadrant of a planar rectangular coordinate system; adding the first distance from the second detection point to the first detection point and the first parameter to obtain a second parameter; and inputting the second parameter, as an independent variable, into the preset function to obtain the updated probability value of the second detection point.

In some embodiments, the preset function is a portion of a Gaussian function located in the first quadrant of the planar rectangular coordinate system, and the Gaussian function is as following:

$$f(x) = ae^{-(x-b)^2/2c^2};$$

where a, b and c are real constants, and a is greater than 0, x is the second parameter, and f(x) is the updated probability value of the second detection point.

In some embodiments, the preset function is a portion of a linear function located in the first quadrant of the planar rectangular coordinate system, and the linear function is as following:

$$f(x) = kx + b;$$

where k and b are real constants, and k is less than 0, x is the second parameter, and f(x) is the updated probability value of the second detection point.

In some embodiments, comparing the updated probability value with the probability threshold to obtain the comparison result, and determining, according to the comparison result, whether the new target exists in the region corresponding to the second detection point includes: determining whether the updated probability value is greater than or equal to the probability threshold; if it is determined that the updated probability value is greater than or equal to the probability threshold, determining that the new target exists in the region corresponding to the second detection point; and if it is determined that the updated probability value is not greater than or equal to the probability threshold, determining that no new target exists in the region corresponding to the second detection point.

In some embodiments, the target detection method further includes: if it is determined that the first distance is less than the distance threshold, detecting that the region corresponding to the second detection point and the region corresponding to the first detection point have a same target.

In some embodiments, determining, according to the image to be detected, the plurality of detection points corresponding to the plurality of regions in the image to be detected, and the probability value of the target existing in the region corresponding to each detection point includes: inputting the image to be detected into a trained target network model for feature extraction to obtain feature information. The feature information includes a target feature map and a probability value of the target existing at each detection point in the target feature map; and a resolution of the target feature map is 1/n times a resolution of the image to be detected, and n is greater than 1.

In some embodiments, the feature information further includes a position compensation accuracy of each detection point. The target detection method further includes: determining, according to the first detection point and a position compensation accuracy of the first detection point, a central point of the target corresponding to the first detection point in the image to be detected; and determining, according to the second detection point with the new target existing in the region corresponding to the second detection point and a position compensation accuracy of the second detection point, a central point of the new target corresponding to the second detection point in the image to be detected.

In some embodiments, the feature information further includes a regression size of each target. The target detection method further includes: determining, according to the regression size of each target, a region where each detected target is located in the image to be detected.

In some embodiments, the target network model includes a down-sampling module, an up-sampling module and a residual module. The down-sampling module is configured to perform a down-sampling operation on the image to be detected to obtain a feature map; the up-sampling module is configured to perform an up-sampling operation on the feature map; and the residual module is configured to extract a plurality of input image features from the image to be detected.

In some embodiments, the probability threshold is in a range of 0.4 to 0.6, inclusive.

In yet another aspect, a computer device is provided. The computer device includes a memory and a processor. The memory is configured to store computer program instructions. The processor is configured to execute the computer program instructions to implement the target detection method as described in any of the above embodiments.

In yet another aspect, a non-transitory computer-readable storage medium is provided. The non-transitory computer-readable storage medium stores computer program instructions that, when run on a processor, cause the processor to perform the target detection method as described in any of the above embodiments.

In some embodiments, the up-sampling module is configured to perform the up-sampling operation on the feature map includes the up-sampling module is configured to perform the up-sampling operation on the feature map according to the plurality of input image features.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
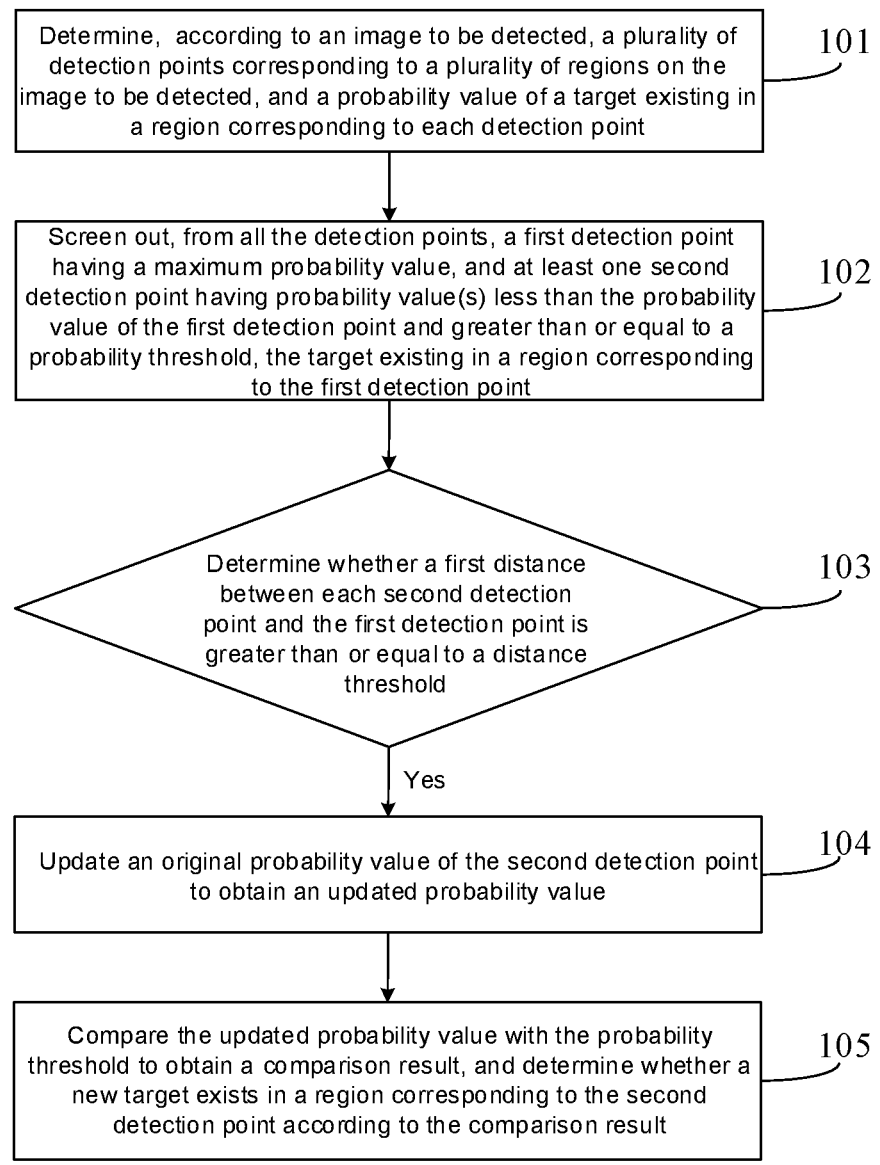
FIG. 1 is a flow diagram of a target detection method, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained on the basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. The term "coupled" or "communicatively coupled", however, may also mean that two or more components are not in direct contact with each other, but still cooperate or interact with each other. The embodiments disclosed herein are not necessarily limited to the contents herein.

The use of the phrase "applicable to" or "configured to" herein means an open and inclusive language, which does not exclude devices that are applicable to or configured to perform additional tasks or steps.

Exemplary embodiments are described herein with reference to sectional views and/or plan views as idealized exemplary accompanying drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed to be limited to shapes of regions shown herein, but to include deviations in shape due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

Target detection of images is one of the most common research directions that has practical significance of application in the field of computer vision. In recent years, convolutional neural networks have shown great advantages in the field of image processing, especially in detection and recognition of targets. However, a method in an implementation needs to preset anchor boxes, which requires prior knowledge of a target to be detected, increases hyperparameters that need to be set in the method, and generates a large number of invalid anchor boxes to be detected, wasting computing resources. In addition, when unknown overlapping targets are detected, the method in the implementation is to directly remove potential target points with large probability values near the target, which results in a poor detection capability in a scene with dense targets.

On this basis, some embodiments of the present disclosure provide a target detection method. As shown in FIG. 1, the target detection method includes step 101 to step 105.

In step 101, according to an image to be detected, a plurality of detection points corresponding to a plurality of regions in the image to be detected, and a probability value of a target existing in a region corresponding to each detection point are determined.

For example, the image to be detected may be input into a trained target network model for feature extraction to obtain feature information. The feature information includes a target feature map and a probability value of a target existing at each detection point in the target feature map. A resolution of the target feature map is 1/n times a resolution of the image to be detected, and n is greater than 1 (n>1).

For example, the target network model is an hourglass network model.

Figure 2:
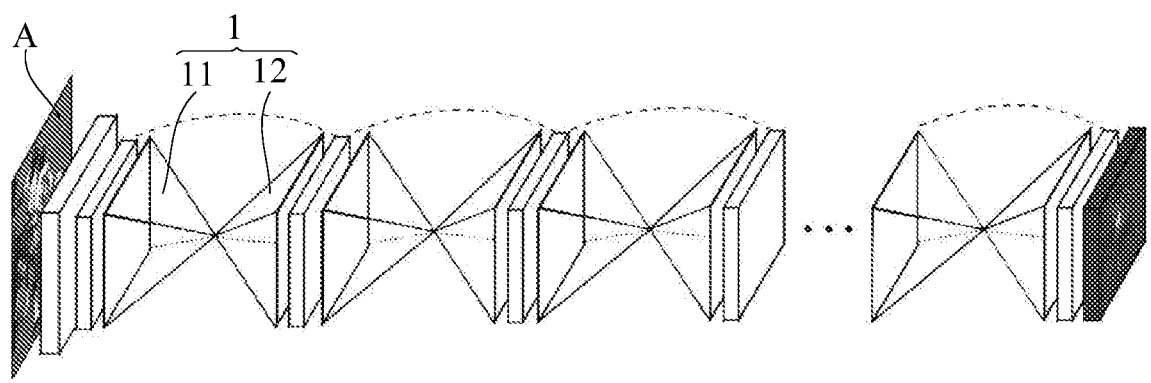
FIG. 2 is a diagram showing a target network model, in accordance with some embodiments of the present disclosure.

For example, as shown in FIG. 2, the target network model includes down-sampling module(s) 11 and up-sampling module(s) 12, and a down-sampling module 11 and an up-sampling module 12 form an hourglass structure 1.

Figure 3:
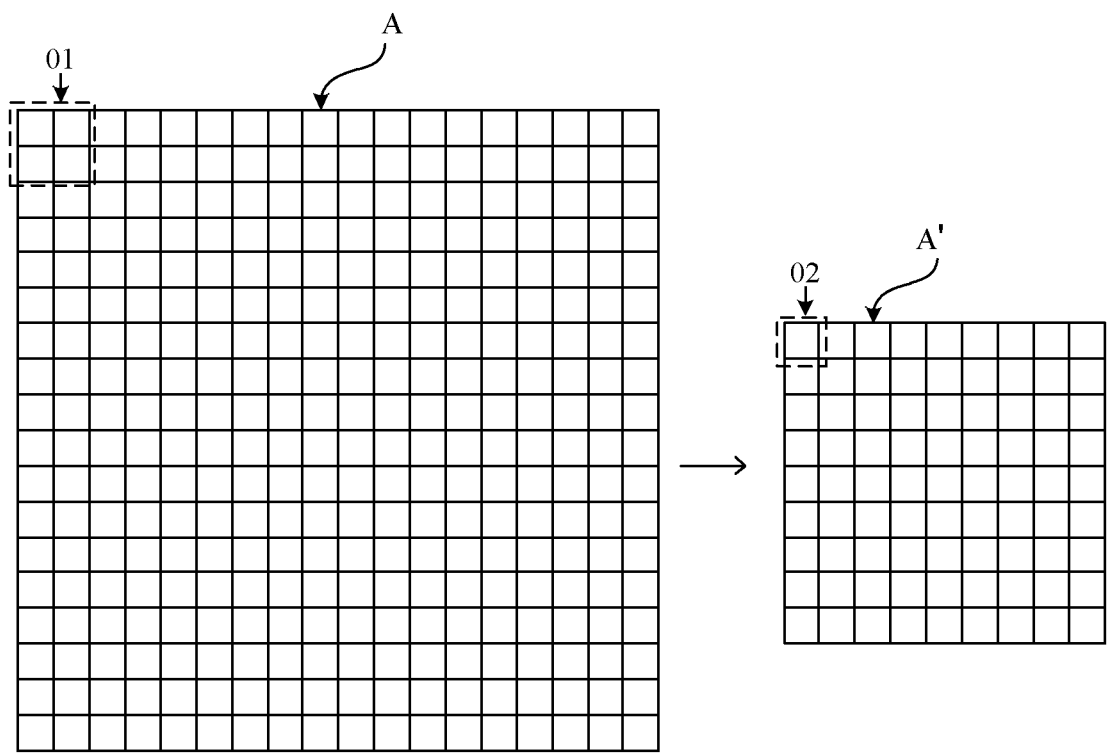
FIG. 3 is a diagram showing an image to be detected and a feature map corresponding thereto, in accordance with some embodiments of the present disclosure.

The down-sampling module 11 may be configured to perform a down-sampling operation on an image A to be detected to obtain a feature map. In some examples, the down-sampling operation may be to extract data from the image A to be detected at uniform intervals, thereby reducing a size of the image A to be detected. For example, if a down-sampling operation by a factor of two is performed, the size of the image A to be detected may be reduced from 4×4 to 2×2. In this case, a resolution of the obtained feature map is ½ times a resolution of the image A to be detected. If a down-sampling operation by a factor of four is performed, the size of the image A to be detected may be reduced from 8×8 to 2×2. In this case, the resolution of the obtained feature map is ¼ times the resolution of the image A to be detected. As shown in FIG. 3, in an example in which the down-sampling operation by the factor of two is performed, the down-sampling operation may map all pixels in a region 01 of 2×2 in the image A to be detected to a pixel 02 in the feature map A'. For example, an average of pixel values of all pixels in the region 01 may be used as a pixel value of the pixel 02 in the image after the down-sampling operation. In the feature map A', each pixel 02 corresponds to a detection point.

The up-sampling module 12 may be configured to perform an up-sampling operation on the obtained feature map. In some examples, the up-sampling operation may be to perform interpolation on the feature map at uniform intervals. For example, if an up-sampling operation by a factor of two is performed, a size of the feature map may be increased from 2×2 to 4×4. In this case, the feature map may be well restored to the image A to be detected. If an up-sampling operation by a factor of four is performed, the size of the feature map may be increased from 2×2 to 8×8. In this case, the feature map may be well restored to the image A to be detected. The up-sampling operation may include performing interpolation operation on an image. For example, the interpolation operation includes neighbor interpolation (e.g., bilinear interpolation, bicubic interpolation, or spline interpolation), edge-based interpolation and/or region-based interpolation.

Figure 4:
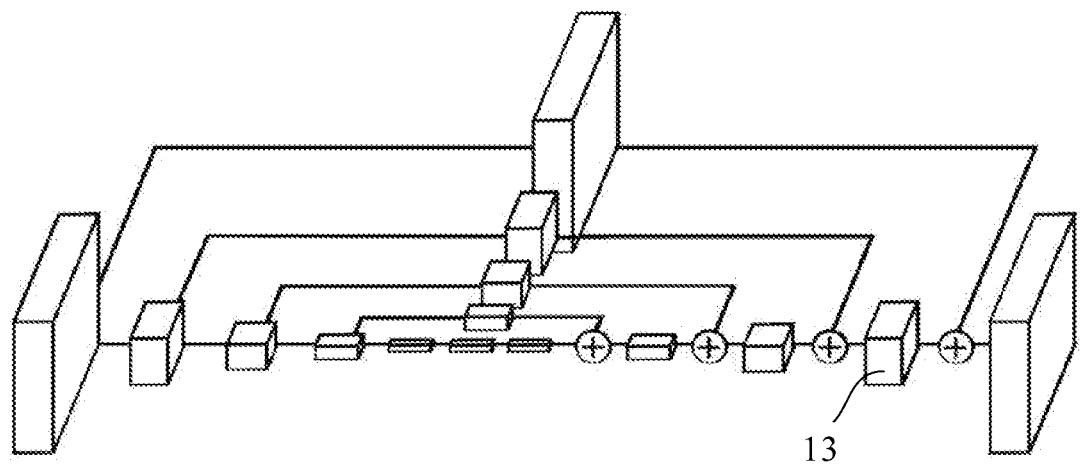
FIG. 4 is a diagram showing another target network model, in accordance with some embodiments of the present disclosure.
Figure 5:
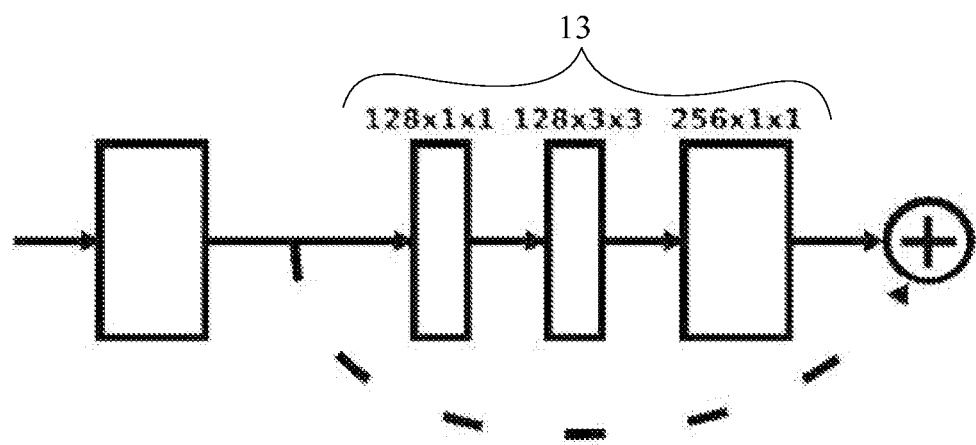
FIG. 5 is a diagram showing a residual module in a target network model, in accordance with some embodiments of the present disclosure.

On this basis, for example, the target network model further includes a residual module 13. For example, FIG. 4 shows another structure of the target network model, and FIG. 5 shows a residual module in FIG. 4. The residual module 13 may extract a plurality of input image features from the image to be detected, and the up-sampling module 12 can perform the up-sampling operation on the feature map according to the plurality of input image features, so that the feature map may be well restore to the image A to be detected.

It will be noted that the size of the image A to be detected or the feature map may not be an actual size thereof, but is only used to represent a proportional relationship between the size of the image A to be detected and the size of the feature map. In a case where the size of the image A to be detected is 1024×1024, after the down-sampling operation by the factor of two is performed, the size of the obtained feature map may be 512×512, and the resolution of the obtained feature map is ½ times the resolution of the image A to be detected; and after the down-sampling operation by the factor of four is performed, the size of the obtained feature map may be 256×256, and the resolution of the obtained feature map is ¼ times the resolution of the image A to be detected. Therefore, the resolution of the feature map obtained by the down-sampling module 11 may be 1/n times the resolution of the image A to be detected, and n is greater than 1 (n>1).

Referring to FIG. 2, after the image A to be detected is input into the target network model, a plurality of hourglass structures 1 may perform the down-sampling operation and the up-sampling operation repeatedly, and a feature map obtained after each down-sampling operation is performed is well restored to the image A to be detected through the up-sampling operation. In this case, a plurality of feature maps with different sizes may be obtained. On this basis, the target network model may process one or more obtained feature maps, so as to output the feature information. The feature information includes the target feature map and the probability value of the target existing at each detection point in the target feature map.

Since the resolution of the target feature map is 1/n times the resolution of the image to be detected, and n is greater than 1 (n>1), each detection point in the target feature map may correspond to a region in the image to be detected, such as a region of 2×2, or, a region of 4×4.

The target network model may output a probability value $P_{(i,j)}$ of a c-th type target existing at a detection point (i.e., a region in the image to be detected corresponding to the detection point) at a position (i, j) in the target feature map. If $P_{(i,j)}$ is equal to 1 (i.e., $P_{(i,j)}=1$), the c-th type target exists in the region corresponding to the detection point at the position (i, j); if $P_{(i,j)}$ is equal to 0 (i.e., $P_{(i,j)}=0$), no c-th type target exists in the region corresponding to the detection point at the position (i, j); and if $P_{(i,j)}$ is greater than 0 and less than 1 (i.e., $0<P_{(i,j)}<1$), the c-th type target may exist in the region corresponding to the detection point at the position (i, j).

In step 102, a first detection point having a maximum probability value, and at least one second detection point having probability value(s) less than the probability value of the first detection point and greater than or equal to a probability threshold are screened out from all the detection points; and a target exists in a region corresponding to the first detection point.

Figure 6:
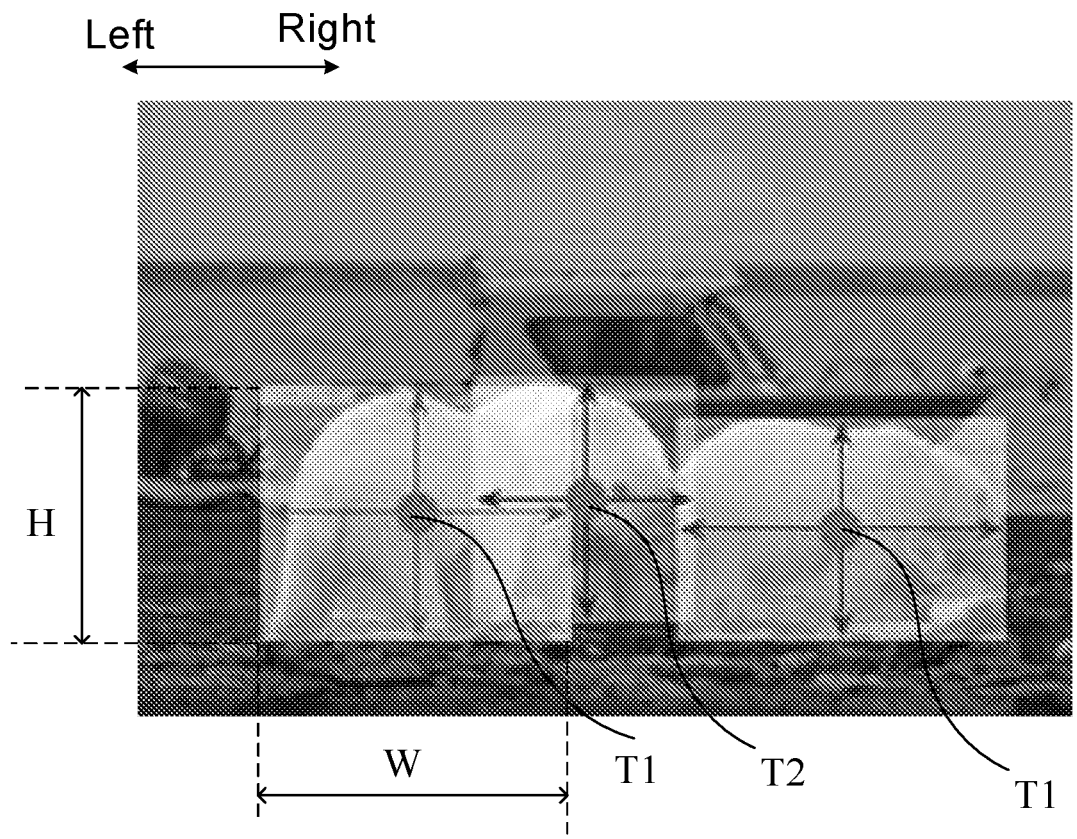
FIG. 6 is a diagram showing a target feature map, in accordance with some embodiments of the present disclosure.

FIG. 6 shows a target feature map. In some examples, the feature information includes width and height information of the target feature map, and may further include the number of target types in the target feature map.

As shown in FIG. 6, a probability value of a target (i.e., a polar bear) existing at the first detection point T1 is 1; and a probability value of a target (i.e., a polar bear) existing at the second detection point T2 is greater than 0 and is less than 1. By inputting the image to be detected into the trained target network model, it may be directly detected that there is the target in a region corresponding to the first detection point T1. For example, polar bears respectively exist in regions corresponding to two first detection points T1 in FIG. 6. Moreover, in some examples, the feature information further includes a position compensation accuracy of each detection point. Through the trained target network model, a central point of the target corresponding to the first detection point T1 in the image A to be detected may be determined according to the first detection point T1 and a position compensation accuracy thereof; and a central point of the new target corresponding to the second detection point T2 in the image A to be detected may be determined according to the second detection point T2 with the new target existing in the region corresponding to the second detection point T2 and a position compensation accuracy thereof. On this basis, for example, the feature information further includes a regression size of each target. According to image features around the first detection point T1 (e.g., probability values of detection points surrounding the first detection point T1), a width and a height of a target corresponding to the first detection point T1 in the target feature map may be obtained. For example, a width of a target corresponding to the first detection point T1 on the left is W, and a height of the target corresponding to the first detection point T1 on the left is H. Then, according to a regression size of the target, a region where the target is located in the image to be detected may be determined, so that a position of the target may be detected accurately. In addition, in the embodiments, the target is detected directly through multiple detection points in the target feature map, so that the target detection method in the embodiments may detect the target in the image without a need to preset anchor boxes. Therefore, there is no need to set prior knowledge of the target to be detected and set hyperparameters in the method, and a large number of invalid anchor boxes to be detected will not be generated, which saves computing resources.

In the implementation, in a case where overlapping targets, for example, two polar bears corresponding to the first detection point T1 on the left and the second detection point T2 in FIG. 6, are detected, if a distance between the second detection point T2 and the first detection point T1 on the left is small, and the probability value of the second detection point T2 is less than the probability value of the first detection point T1 on the left, the target corresponding to the second detection point T2 cannot be detected. That is, in the implementation, for the first detection point T1 on the left and the second detection point T2, only one polar bear can be detected. Thus, it is difficult to effectively detect dense targets.

In step 103, whether a first distance between each second detection point and the first detection point is greater than or equal to a distance threshold is determined; and if it is determined that the first distance is greater than or equal to the distance threshold, step 104 is performed.

In step 104, an original probability value of the second detection point is updated to obtain an updated probability value.

In step 105, the updated probability value is compared with the probability threshold to obtain a comparison result; and whether a new target exists in a region corresponding to the second detection point is determined according to the comparison result.

The distance threshold may be set according to application scenarios, and different application scenarios (e.g., an image to be detected corresponding to a crossroads, and an image to be detected corresponding to a school gate) correspond to different distance thresholds, which is not limited in the embodiments of the present disclosure.

In this embodiment, if it is determined that the distance between the second detection point T2 and the first detection point T1 is greater than or equal to the distance threshold, it is considered that a new target may exist in the region corresponding to the second detection point T2. In this case, by performing steps 104 and 105, the original probability value of the second detection point T2 is updated to obtain the updated probability value, the updated probability value is compared with the probability threshold to obtain the comparison result, and whether the new target exits in the region corresponding to the second detection point may be determined according to the comparison result. Therefore, the embodiments may detect dense targets more effectively.

For example, the probability threshold is in a range of 0.4 to 0.6, inclusive. The probability threshold may be 0.5.

Figure 7:
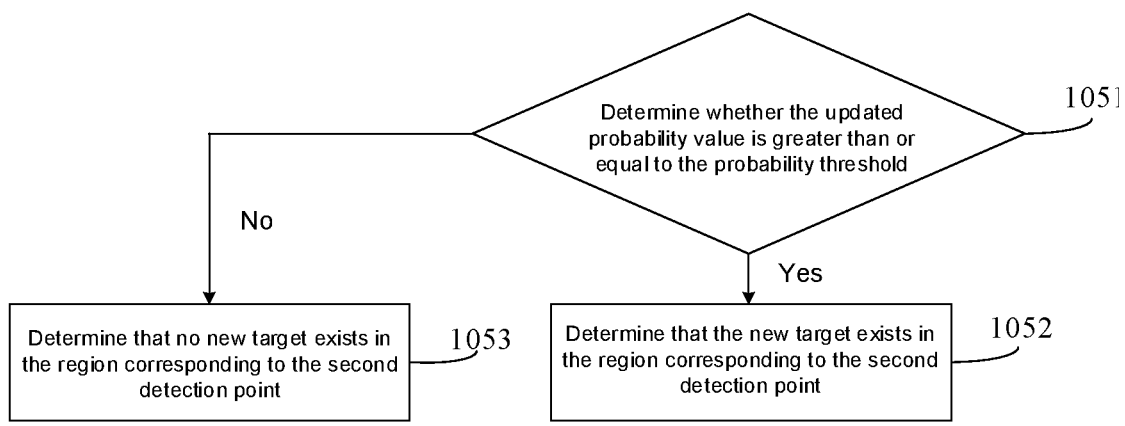
FIG. 7 is a flow diagram of another target detection method, in accordance with some embodiments of the present disclosure.

In some embodiments, as shown in FIG. 7, the step 105 includes step 1051 to step 1053.

In step 1051, whether the updated probability value is greater than or equal to the probability threshold is determined; if it is determined that the updated probability value is greater than or equal to the probability threshold, step 1052 is performed, i.e., the new target existing in the region corresponding to the second detection point is determined; and if it is determined that the updated probability value is not greater than or equal to the probability threshold, step 1053 is performed, i.e. no new target existing in the region corresponding to the second detection point is determined.

On this basis, in some embodiments, the step 104 includes step 104A and step 104B.

Figure 8:
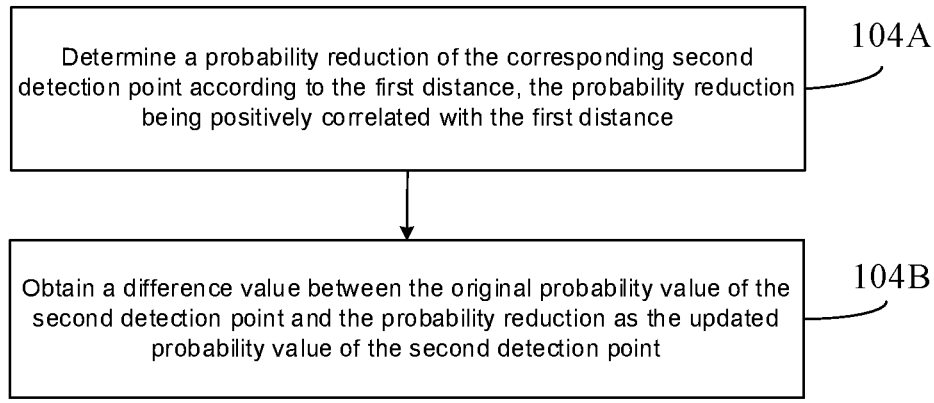
FIG. 8 is a flow diagram of yet another target detection method, in accordance with some embodiments of the present disclosure.

As shown in FIG. 8, in step 104A, a probability reduction of the second detection point is determined according to the first distance, and the probability reduction is positively correlated with the first distance. Each first distance has a corresponding probability reduction.

In step 104B, a difference value between the original probability value and the probability reduction of the second detection point is obtained as the updated probability value of the second detection point.

In the embodiments, since the probability reduction is positively correlated with the first distance, the updated probability value of the second detection point T2 may be less than a probability value of the second detection point T2 before updating. In this way, it is beneficial to reduce an amount of subsequent data processing and improve computing efficiency. Furthermore, since the updated probability value of the second detection point T2 is less than the probability value of the second detection point T2 before updating, it is possible to screen out a second detection point with a large probability value before updating, so that adjacent targets may be detected accurately. In addition, for second detection points with the same probability value before updating but different distances to the first detection point, the longer a distance from a second detection point to the first detection point, the greater a reduction magnitude of an updated probability value of the second detection point relative to a probability value thereof before updating. In this way, it is possible to reduce the amount of the subsequent data processing, improve the computing efficiency, and detect and recognize the adjacent targets accurately.

In some other embodiments, the step 104 includes step 1041 to step 1043.

Figure 9:
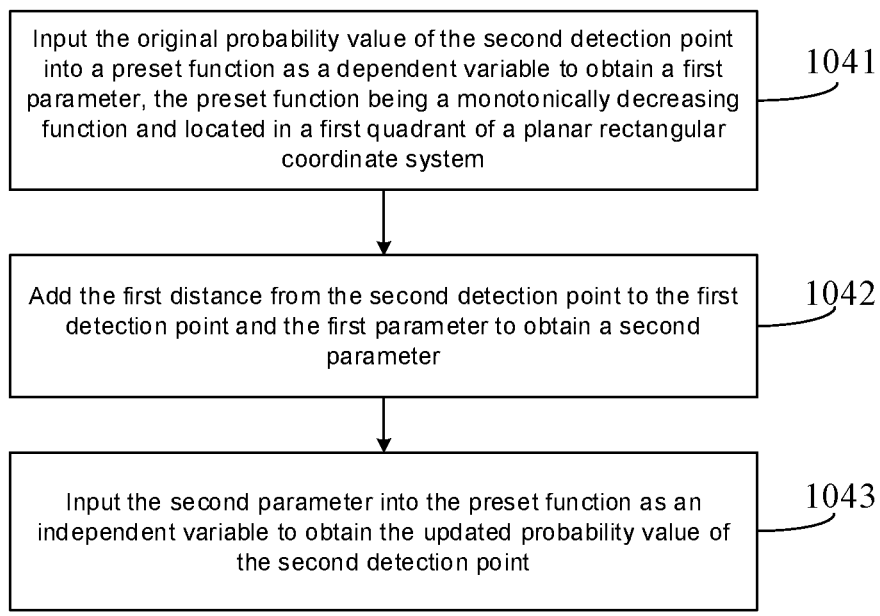
FIG. 9 is a flow diagram of yet another target detection method, in accordance with some embodiments of the present disclosure.

As shown in FIG. 9, in step 1041, the original probability value of the second detection point is input into a preset function as a dependent variable to obtain a first parameter; and the preset function is a monotonically decreasing function, and is located in a first quadrant of a planar rectangular coordinate system.

In step 1042, the first distance from the second detection point to the first detection point and the first parameter are added to obtain a second parameter.

In step 1043, the second parameter is input into the preset function as an independent variable to obtain the updated probability value of the second detection point.

In these embodiments, for second detection points with the same probability value before updating but different distances to the first detection point, the greater a distance from a second detection point to the first detection point (i.e., the greater a first distance of a second detection point), the greater a reduction magnitude of an updated probability value of the second detection point relative to a probability value thereof before updating. In this way, it is possible to reduce an amount of subsequent data processing, improve the computing efficiency, and detect and recognize the adjacent targets accurately.

It will be noted that, the monotonically decreasing function has various forms. For example, the embodiments of the present disclosure include, but are not limited to, some examples as described below.

In some examples, the preset function is a portion of a Gaussian function located in the first quadrant of the planar rectangular coordinate system, and the Gaussian function is as following:

$$f(x)=ae^{-(x-b)^2/2c^2};$$

where a, b and c are real constants, and a is greater than 0 (a>0), x is the second parameter, and f(x) is the updated probability value of the second detection point.

In these examples, the portion of the Gaussian function located in the first quadrant of the planar rectangular coordinate system is a monotonically decreasing function, and according to the Gaussian function, it will be seen that the larger the second parameter, the smaller the obtained updated probability value. That is, for the second detection points with the same probability value before updating but different distances to the first detection point, the greater the distance from the second detection point to the first detection point, the greater the reduction magnitude of the updated probability value of the second detection point relative to the probability value thereof before updating. Therefore, it is possible to detect and recognize the adjacent targets more accurately.

In some other examples, the preset function is a portion of a linear function located in the first quadrant of the planar rectangular coordinate system, and the linear function is as following:

$$f(x)=kx+b;$$

where k and b are real constants, and k is less than 0 (k<0), x is the second parameter, and f(x) is the updated probability value of the second detection point.

In these examples, the portion of the linear function located in the first quadrant of the planar rectangular coordinate system is a monotonically decreasing function, and according to the linear function, it will be seen that the larger the second parameter, the smaller the updated probability value. That is, the greater the distance from the second detection point to the first detection point, the greater the reduction magnitude of the updated probability value of the second detection point relative to the probability value thereof before updating. Therefore, it is possible to detect and recognize the adjacent targets more accurately.

Figure 10:
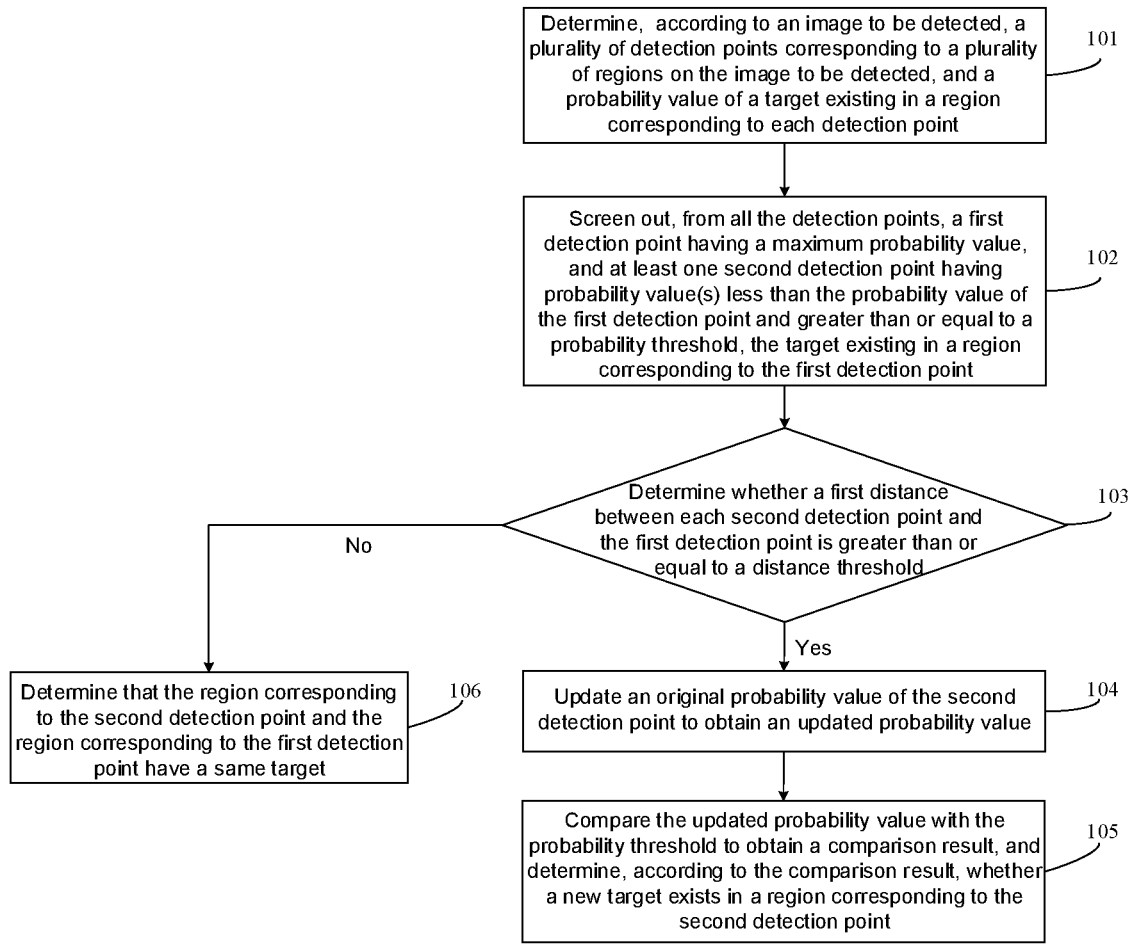
FIG. 10 is a flow diagram of yet another target detection method, in accordance with some embodiments of the present disclosure.

In some embodiments, referring to FIG. 10, the target detection method further includes: performing step 106 if it is determined that the distance between the second detection point and the first detection point is less than the distance threshold.

In step 106, it is determined that the region corresponding to the second detection point and the region corresponding to the first detection point have a same target. For example, referring to FIG. 6, if the second detection point T2 is located in a rectangular region, where the polar bear on the left is located, corresponding to the first detection point, it may be considered that the region corresponding to the second detection point and the region corresponding to the first detection point correspond to the same target.

In another aspect, some embodiments of the present disclosure provide a target detection apparatus. The target detection apparatus may be divided into functional modules according to the target detection method in the above embodiments or examples. For example, each functional module is configured to implement one or more steps in the target detection method. The functional modules may be implemented in a form of hardware or a form of software functional components. It will be noted that the division of the modules in some embodiments of the present disclosure is illustrative, and is only a kind of logical functional division, and there may be other division manners in practical implementation.

Figure 11:
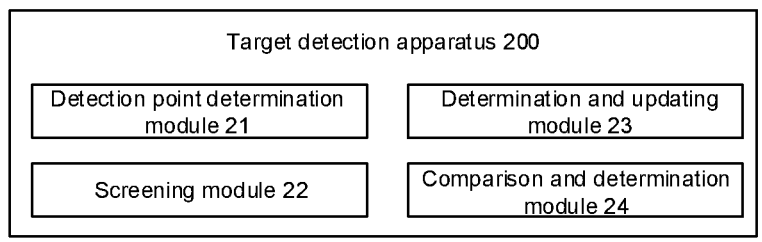
FIG. 11 is a block diagram of a target detection apparatus, in accordance with some embodiments of the present disclosure.

In some examples, FIG. 11 is a schematic diagram showing a possible composition of the target detection apparatus involved in the embodiments. As shown in FIG. 11, the target detection apparatus 200 includes: a detection point determination module 21, a screening module 22, a determination and updating module 23, and a comparison and determination module 24.

The detection point determination module 21 is configured to determine, according to the image to be detected, the plurality of detection points corresponding to the plurality of regions in the image to be detected, and the probability value of the target existing in the region corresponding to each detection point. That is, the detection point determination module 21 may support the target detection apparatus 200 to perform the step 101.

The screening module 22 is configured to screen out, from all the detection points, the first detection point having the maximum probability value, and at least one second detection point having the probability value less than the probability value of the first detection point and greater than or equal to the probability threshold, the target existing in the region corresponding to the first detection point. That is, the screening module 22 may support the target detection apparatus 200 to perform the above-mentioned step 102.

The determination and updating module 23 is configured to determine whether the distance between each second detection point and the first detection point is greater than or equal to the distance threshold; and if the distance between each second detection point and the first detection point is greater than or equal to the distance threshold, update the probability value of the second detection point to obtain the updated probability value. That is, the determination and updating module 23 may support the target detection apparatus 200 to perform the steps 103 and 104.

The comparison and determination module 24 is configured to compare the updated probability value with the probability threshold to obtain the comparison result, and determine whether a new target exists in the region corresponding to the second detection point according to the comparison result. That is, the comparison and determination module 24 may support the target detection apparatus 200 to perform the step 105.

It will be noted that all relevant contents of the steps involved in the target detection method in the embodiments can be cited in functional descriptions of corresponding functional modules, and details will not be repeated here.

The target detection apparatus provided in some embodiments of the present disclosure is configured to perform the target detection method, and thus can achieve the same effects as the target detection method.

Figure 12:
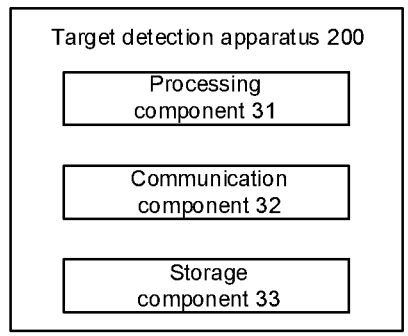
FIG. 12 is a block diagram of another target detection apparatus, in accordance with some embodiments of the present disclosure.

In some other examples, FIG. 12 is a schematic diagram showing another possible composition of the target detection apparatus involved in the embodiments. As shown in FIG. 12, the target detection apparatus 200 includes: a processing component 31, a communication component 32, and a storage component 33.

The processing component 31 is configured to control and manage actions of the target detection apparatus, for example, the processing component 31 is configured to support the target detection apparatus to perform one or more steps in the target detection method. The communication component 32 is configured to support communication of the target detection apparatus with other network entities. The storage component 33 is configured to store program codes and data of the target detection apparatus.

For example, the processing component 31 is a processor. The processor may be a component or a circuit, which implements or executes steps in the target detection method described in the embodiments of the present disclosure. The processor may also be a combination for achieving computing functions, such as a combination of one or more microprocessors, and a combination of a digital signal processor (DSP) and a microprocessor. The communication component 32 may be a communication interface. The storage component 33 may be a memory.

On this basis, some embodiments of the present disclosure further provide a display apparatus. The display apparatus includes the target detection apparatus described in any of the above embodiments.

For example, the display apparatus may be any product or component having a display function, such as an augmented reality (AR) helmet, AR glasses, a mobile phone, a tablet computer, a television, a display, a notebook computer, a digital photo frame, and a navigator.

The display apparatus provided in some embodiments of the present disclosure may perform the target detection method through the target detection apparatus, and thus can achieve the same effects as the target detection method.

Figure 13:
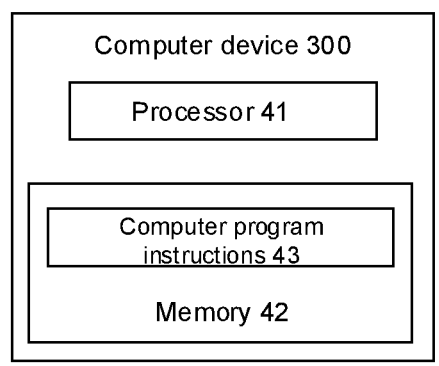
FIG. 13 is a block diagram of a computer device, in accordance with some embodiments of the present disclosure.

Some embodiments of the present disclosure further provide a computer device. As shown in FIG. 13, the computer device 300 includes a memory 42 and a processor 41. The memory 42 is configured to store computer program instructions 43. The processor 41 is configured to execute the computer program instructions 43 to implement one or more steps in the target detection method.

Some embodiments of the present disclosure provide a computer-readable storage medium (e.g., a non-transitory computer-readable storage medium). The computer-readable storage medium has stored therein computer program instructions that, when run on a processor, cause the processor to perform one or more steps in the target detection method as described in any of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card, and a flash memory device (e.g., an erasable programmable read-only memory (EPROM)), a card, a stick or a key driver). Various computer-readable storage media described in the embodiments of the present disclosure may refer to one or more devices and/or other machine-readable storage media for storing information. The term "machine-readable storage media" may include, but are not limited to, wireless channels and other various media capable of storing, containing and/or carrying instructions and/or data.

Some embodiments of the present disclosure further provide a computer program product. The computer program product includes computer program instructions that, when executed on a computer, cause the computer to perform one or more steps in the target detection method as described in the above embodiments.

Some embodiments of the present disclosure further provide a computer program. When executed on a computer, the computer program causes the computer to perform one or more steps in the target detection method as described in the above embodiments.

Beneficial effects of the computer device, the computer-readable storage medium, the computer program product, and the computer program are the same as the beneficial effects of the target detection method described in the embodiments, which will not be repeated here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A target detection method, comprising:
determining, according to an image to be detected, a plurality of detection points corresponding to a plurality of regions in the image to be detected, and a probability value of a target existing in a region corresponding to each detection point;
screening out, from all the detection points, a first detection point having a maximum probability value, and at least one second detection point having at least one probability value less than the probability value of the first detection point and greater than or equal to a probability threshold, wherein the target exists in a region corresponding to the first detection point;
determining whether a first distance between each second detection point and the first detection point is greater than or equal to a distance threshold;
if it is determined that the first distance is greater than or equal to the distance threshold, updating an original probability value of the second detection point to obtain an updated probability value;
comparing the updated probability value with the probability threshold to obtain a comparison result; and
determining, according to the comparison result, whether a new target exists in a region corresponding to the second detection point;
wherein updating the original probability value of the second detection point to obtain the updated probability value includes:
inputting the original probability value of the second detection point, as a dependent variable, into a preset function to obtain a first parameter, wherein the preset function is a monotonically decreasing function and located in a first quadrant of a planar rectangular coordinate system;
adding the first distance from the second detection point to the first detection point and the first parameter to obtain a second parameter; and
inputting the second parameter, as an independent variable, into the preset function to obtain the updated probability value of the second detection point.

2. A target detection method, comprising:
determining, according to an image to be detected, a plurality of detection points corresponding to a plurality of regions in the image to be detected, and a probability value of a target existing in a region corresponding to each detection point;
screening out, from all the detection points, a first detection point having a maximum probability value, and at least one second detection point having at least one probability value less than the probability value of the first detection point and greater than or equal to a probability threshold, wherein the target exists in a region corresponding to the first detection point;
determining whether a first distance between each second detection point and the first detection point is greater than or equal to a distance threshold;
if it is determined that the first distance is greater than or equal to the distance threshold, updating an original probability value of the second detection point to obtain an updated probability value;
comparing the updated probability value with the probability threshold to obtain a comparison result; and
determining, according to the comparison result, whether a new target exists in a region corresponding to the second detection point;
wherein updating the original probability value of the second detection point to obtain the updated probability value includes:
determining, according to the first distance, a probability reduction of the second detection point, wherein the probability reduction is positively correlated with the first distance; and obtaining a difference value between the original probability value of the second detection point and the probability reduction as the updated probability value of the second detection point.

3. The target detection method according to claim 1, wherein the preset function is a portion of a Gaussian function located in the first quadrant of the planar rectangular coordinate system, and the Gaussian function is as following:

$$f(x)=ae^{-(x-b)^2/2c^2};$$

wherein a, b and c are real constants, and a is greater than 0, x is the second parameter, and f(x) is the updated probability value of the second detection point.

4. The target detection method according to claim 1, wherein the preset function is a portion of a linear function located in the first quadrant of the planar rectangular coordinate system, and the linear function is as following:

$$f(x)=kx+b;$$

wherein k and b are real constants, and k is less than 0, x is the second parameter, and f(x) is the updated probability value of the second detection point.

5. The target detection method according to claim 1, wherein comparing the updated probability value with the probability threshold to obtain the comparison result, and determining, according to the comparison result, whether the new target exists in the region corresponding to the second detection point includes:
determining whether the updated probability value is greater than or equal to the probability threshold;
if it is determined that the updated probability value is greater than or equal to the probability threshold, determining that the new target exists in the region corresponding to the second detection point; and
if it is determined that the updated probability value is not greater than or equal to the probability threshold, determining that no new target exists in the region corresponding to the second detection point.

6. The target detection method according to claim 1, further comprising:
if it is determined that the first distance is less than the distance threshold, determining that the region corresponding to the second detection point and the region corresponding to the first detection point have a same target.

7. The target detection method according to claim 1, wherein determining, according to the image to be detected, the plurality of detection points corresponding to the plurality of regions in the image to be detected, and the probability value of the target existing in the region corresponding to each detection point includes:

inputting the image to be detected into a trained target network model for feature extraction to obtain feature information, wherein the feature information includes a target feature map and a probability value of the target existing at each detection point in the target feature map; and a resolution of the target feature map is 1/n times a resolution of the image to be detected, and n is greater than 1.

8. The target detection method according to claim 7, wherein the feature information further includes a position compensation accuracy of each detection point; and the target detection method further comprises:

determining, according to the first detection point and a position compensation accuracy of the first detection point, a central point of the target corresponding to the first detection point in the image to be detected; and determining, according to the second detection point with the new target existing in the region corresponding to the second detection point and a position compensation accuracy of the second detection point, a central point of the new target corresponding to the second detection point in the image to be detected.

9. The target detection method according to claim 8, wherein the feature information further includes a regression size of each target; and the target detection method further comprises:

determining, according to the regression size of each target, a region where each detected target is located in the image to be detected.

10. The target detection method according to claim 7, wherein the target network model includes a down-sampling module, an up-sampling module and a residual module;

the down-sampling module is configured to perform a down-sampling operation on the image to be detected to obtain a feature map;

the up-sampling module is configured to perform an up-sampling operation on the feature map; and the residual module is configured to extract a plurality of input image features from the image to be detected.

11. The target detection method according to claim 1, wherein the probability threshold is in a range of 0.4 to 0.6, inclusive.

12. A computer device, comprising:

a memory configured to store computer program instructions; and a processor, wherein the processor is configured to execute the computer program instructions to implement the target detection method according to claim 1.

13. A non-transitory computer-readable storage medium, the non-transitory computer-readable storage medium storing computer program instructions that, when run on a processor, cause the processor to perform the target detection method according to claim 1.

14. The target detection method according to claim 10, wherein the up-sampling module is configured to perform the up-sampling operation on the feature map includes the up-sampling module is configured to perform the up-sampling operation on the feature map according to the plurality of input image features.

15. The target detection method according to claim 2, wherein comparing the updated probability value with the probability threshold to obtain the comparison result, and determining, according to the comparison result, whether the new target exists in the region corresponding to the second detection point includes:

determining whether the updated probability value is greater than or equal to the probability threshold;

if it is determined that the updated probability value is greater than or equal to the probability threshold, determining that the new target exists in the region corresponding to the second detection point; and if it is determined that the updated probability value is not greater than or equal to the probability threshold, determining that no new target exists in the region corresponding to the second detection point.

16. The target detection method according to claim 2, wherein determining, according to the image to be detected, the plurality of detection points corresponding to the plurality of regions in the image to be detected, and the probability value of the target existing in the region corresponding to each detection point includes:

inputting the image to be detected into a trained target network model for feature extraction to obtain feature information, wherein the feature information includes a target feature map and a probability value of the target existing at each detection point in the target feature map; and a resolution of the target feature map is 1/n times a resolution of the image to be detected, and n is greater than 1.

17. The target detection method according to claim 16, wherein the feature information further includes a position compensation accuracy of each detection point; and the target detection method further comprises:

determining, according to the first detection point and a position compensation accuracy of the first detection point, a central point of the target corresponding to the first detection point in the image to be detected; and determining, according to the second detection point with the new target existing in the region corresponding to the second detection point and a position compensation accuracy of the second detection point, a central point of the new target corresponding to the second detection point in the image to be detected.

* * * * *